(12) United States Patent
Bauer et al.

(10) Patent No.: US 7,020,263 B2
(45) Date of Patent: Mar. 28, 2006

(54) METHOD AND APPARATUS FOR DYNAMICALLY ALLOCATING BANDWIDTH UTILIZATION IN A PACKET TELEPHONY SYSTEM

(75) Inventors: Eric Jonathan Bauer, Freehold, NJ (US); Yuk-Ming Peter Lam, Colts Neck, NJ (US); John Orleanski, Westfield, NJ (US)

(73) Assignee: Avaya Technology Corp, Basking Ridge, NJ (US)

( * ) Notice: Subject to any disclaimer, the term of this patent is extended or adjusted under 35 U.S.C. 154(b) by 839 days.

(21) Appl. No.: 09/783,191

(22) Filed: Feb. 14, 2001

(65) Prior Publication Data

US 2001/0008556 A1 Jul. 19, 2001

(51) Int. Cl.
*H04J 3/22* (2006.01)
(52) U.S. Cl. .................................. 379/219; 379/221.06
(58) Field of Classification Search ................ 379/219, 379/221.01, 221.06, 221.07, 221.08, 93.15, 379/100.13, 201.01
See application file for complete search history.

(56) References Cited

U.S. PATENT DOCUMENTS

| | | | | |
|---|---|---|---|---|
| 4,890,282 A | | 12/1989 | Lambert et al. | |
| 5,070,527 A | * | 12/1991 | Lynn ........................... | 379/395 |
| 5,444,707 A | | 8/1995 | Cerna et al. | |
| 5,546,395 A | * | 8/1996 | Sharma et al. ................. | 370/84 |
| 5,574,861 A | * | 11/1996 | Lorving et al. ........ | 395/200.06 |
| 5,701,302 A | * | 12/1997 | Geiger ........................ | 370/521 |
| 5,729,532 A | * | 3/1998 | Bales et al. .................. | 379/204 |
| 5,761,634 A | * | 6/1998 | Stewart et al. ............... | 704/220 |
| 5,926,483 A | * | 7/1999 | Javitt .......................... | 370/477 |
| 6,104,803 A | * | 8/2000 | Weser et al. ................. | 379/230 |
| 6,175,856 B1 | * | 1/2001 | Riddle ......................... | 709/204 |
| 6,304,652 B1 | * | 10/2001 | Wallenius .................... | 379/230 |
| 6,356,545 B1 | * | 3/2002 | Vargo et al. ................. | 370/355 |
| 6,445,697 B1 | * | 9/2002 | Fenton ........................ | 370/357 |

FOREIGN PATENT DOCUMENTS

EP 1 024 638 * 2/2000

* cited by examiner

*Primary Examiner*—William J. Deane, Jr.
(74) *Attorney, Agent, or Firm*—Ryan, Mason & Lewis, LLP

(57) ABSTRACT

A network monitoring agent is disclosed that monitors network conditions, such as traffic volume, and determines when to dynamically adjust the encoding scheme for one or more connections. The network monitoring agent can select an encoding standard based on, for example, current network traffic volume, network error characteristics, time of day or day of week. In the illustrative network traffic implementation, an encoding standard that provides a lower degree of compression and a higher quality level is selected at times of lighter network traffic. Likewise, as network traffic increases, an encoding standard that provides a higher degree of compression, although at a lower quality level, is selected in order to maximize the network utilization. The network monitoring agent notifies one or both of the devices associated with each connection of changes in the encoding scheme. Generally, both devices must change the compression algorithm at the same time, to ensure proper decoding of received packets. The initiating device inserts a notification in a field of a predefined number of packet headers to inform the recipient device that subsequent packets will be encoded with a different specified encoding algorithm, until further notice. Thereafter, the recipient device can load the appropriate codec to properly decompress and decode the received packets.

41 Claims, 6 Drawing Sheets

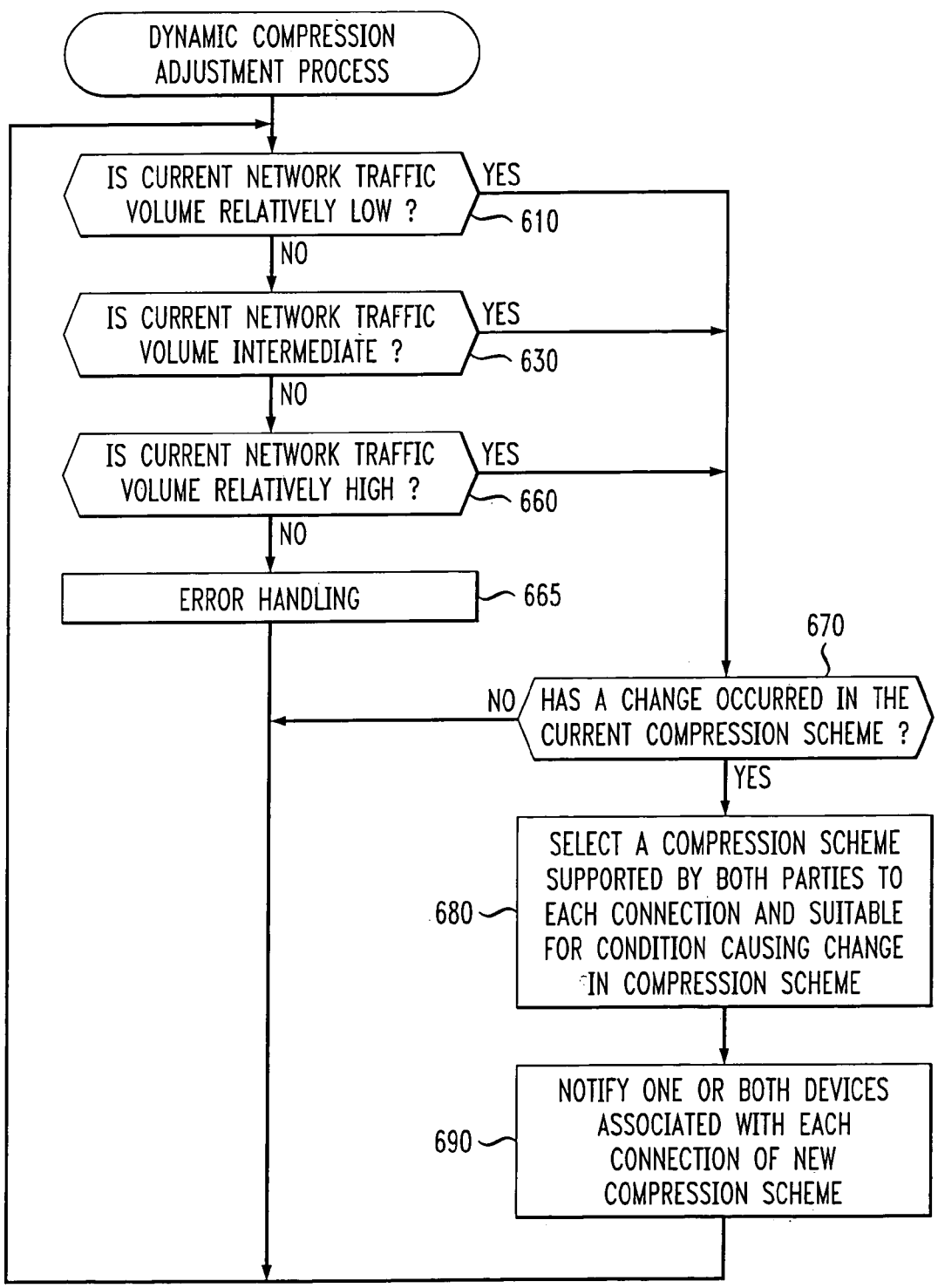

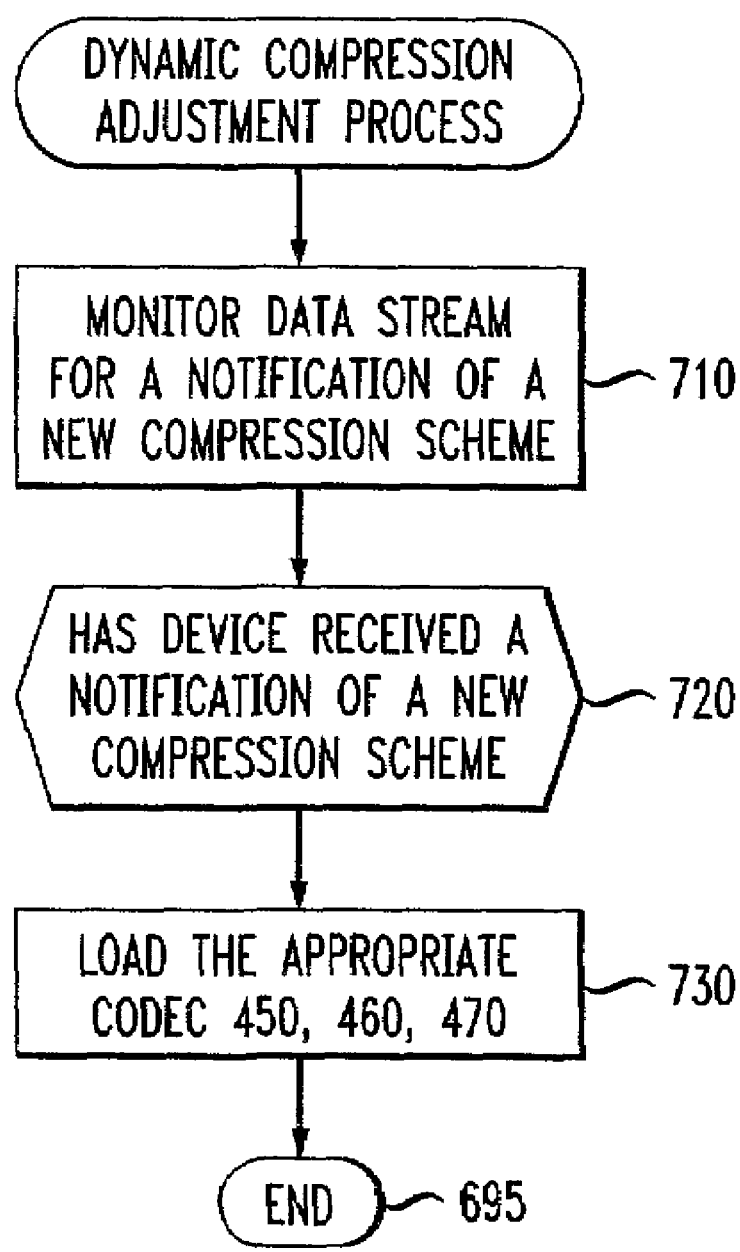

METHOD AND APPARATUS FOR DYNAMICALLY ALLOCATING BANDWIDTH UTILIZATION IN A PACKET TELEPHONY SYSTEM

CROSS-REFERENCE TO RELATED APPLICATION

The present invention is related to United States patent application entitled "Method and Apparatus for Dynamically Exchanging Data Among Participants to a Conference Call," having Ser. No. 09/329,463, filed Jun. 10, 1999, filed contemporaneously herewith, assigned to the assignee of the present invention and incorporated by reference herein.

FIELD OF THE INVENTION

The present invention relates generally to packet telephony systems, and more particularly, to methods and apparatus for allocating the bandwidth utilization in such packet telephony systems.

BACKGROUND OF THE INVENTION

Communication networks are used to transfer information, such as data, voice, text or video information, among communication devices, such as packet telephones, computer terminals, multimedia workstations, and videophones, connected to the networks. A network typically comprises nodes connected to each other, and to communication devices, by various links. Each link is characterized by a bandwidth or link capacity. Information input from the communication devices to the network may be of any form but is often formatted into fixed-length packets or cells.

Packet-switching network architectures are widely used, for example, in popular local-area network (LAN) protocols, such as Ethernet and asynchronous transfer mode (ATM) protocols. In a packet-switched network, data transmissions are typically divided into blocks of data, called packets, for transmission through the network. For a packet to get to its proper destination, the packet must traverse through one or more network switches or intermediate systems. Typically, a packet includes a header, containing source and destination address information, as well as a payload (the actual application data).

FIG. 1 illustrates a conventional multimedia packet telephony system 100. The packet telephony system 100 shown in FIG. 1 includes a packet network 105 that connects a number of devices, such as a private branch exchange (PBX) switch 110, workstation 120, packet telephone adapter 125 and a facsimile machine 130. The network environment 105, the private branch exchange (PBX) switch 110 or the devices themselves include a mechanism for converting voice information to a form suitable for packet transmission.

Voice, video, and other important media types are fundamentally analog. In order to pass analog information over a digital network, it is necessary to encode the analog information into digital data on the transmit side, and decode the digital information back to analog information on the receive side. An encoder, decoder pair is referred to as a "codec." The fundamental variables associated with the encoding scheme are: (1) precision and frequency of analog-to-digital sampling (typically 8-bit samples 8,000 times per second for voice); (2) packetization, meaning how many data packets are sent per second (typically 20, 30 or 40 milliseconds); (3) coding algorithm, such as waveform coding, hybrid coding or voice coding. These fundamental variables determine the processing requirements necessary to implement the encoder and decoder, the bandwidth requirement, and drive the end-to-end media latency. At the source node, the codec uses a coding process to encode the data and transform the data signal into packets. At the receiver, the codec decodes the received packets and recreates the original transmitted information. Currently, an appropriate codec is selected as part of the call setup process and the selected codec is thereafter used for both (unidirectional) half-circuits for the entire connection.

The International Telephony Union (ITU) has defined a number of standards for coding voice and other information. The G.711 standard, for example, encodes Pulse Code Modulation (PCM) voice samples and produces digital audio at 64 kilo-bits-per-second. For each voice sample, the codec stores the corresponding amplitude of the voice signal. The samples can be used by the codec at the destination node to reconstruct the original analog voice information. Other coding standards, such as the G.726, G.728 and G.729 standards, describe various encoding techniques that produce packets of data at various bit-rates. A particular coding standard is selected for a given connection by balancing the desired degree of compression, encoding/decoding complexity and latency with the desired quality of service, in an attempt to maximize overall network utilization while maintaining sufficient quality. The G.711 standard, for example, provides a low degree of compression with an essentially lossless reproduction of the original information, while the G.729A standard requires more procesing resources, however yields a much higher degree of compression with a lossy reproduction of the original information.

While conventional packet telephony systems effectively select an appropriate codec for a given media type to produce satisfactory compression, conventional packet telephony systems do not dynamically adjust the codec selection for a given connection based on network conditions. As apparent from the above-described deficiencies with conventional packet telephony systems, a need exists for a packet telephony system that permits the compression scheme to be dynamically adjusted in response to real-time network conditions. Yet another need exists for a method and apparatus that actively manages the bandwidth of a packet telephony system.

SUMMARY OF THE INVENTION

Generally, a network monitoring agent is disclosed that monitors network conditions, such as traffic volume, and determines when to dynamically adjust the encoding scheme for one or more connections, to thereby maximize the total number of possible connections, while maintaining a desired level of quality. In one implementation, the network monitoring agent selects an encoding standard based on current network traffic volume. At times of lighter network traffic, an encoding standard that provides a lower degree of compression and a higher quality level is selected. Likewise, as network traffic increases, an encoding standard that provides a higher degree of compression, although at a lower quality level, is selected in order to reduce the network utilization. In addition to network traffic, the network monitoring agent may be configured to dynamically adjust the encoding scheme based on other factors, including network error characteristics or time of day.

According to another aspect of the invention, the network monitoring agent notifies one or both of the devices associated with each connection of changes in the encoding scheme. Generally, both devices must change the encoding algorithm at the same time, to ensure proper decoding of received packets. In one implementation, the initiating device inserts a notification in a field of the packet header to inform the recipient device that subsequent packets will be encoded with a different specified encoding algorithm, until further notice. Thereafter, the recipient device can load the appropriate codec to properly decompress and decode the received packets. In a further variation, the notification of a codec change (or the current codec) can be repeatedly included in the packet header at periodic intervals, or repeated a predetermined number of times in successive packets, to maximize the likelihood that the recipient device gets at least one notification.

According to a further aspect of the invention, a method and apparatus are provided for application-dependent selection of one or more encoding schemes that are appropriate for the various tasks to be performed by the application. Each application (or a codec policy agent) dynamically selects an encoding scheme for each (unidirectional) half-circuit based on the requirements of the application. In addition, the compression scheme selected for one or both half-circuits may be dynamically adjusted over time in response to the current needs of a given transaction being performed by the application. For example, after an IVR plays a pre-recorded greeting to the caller using a first compression scheme for the IVR to caller half-circuit, a different compression scheme with improved quality is selected for the caller to IVR half-circuit when the IVR is performing speech recognition. Thereafter, if the caller elects to leave a message, a different compression scheme with higher compression (appropriate for voice mail) is then selected for the caller to IVR half-circuit. A more complete understanding of the present invention, as well as further features and advantages of the present invention, will be obtained by reference to the following detailed description and drawings.

BRIEF DESCRIPTION OF THE DRAWINGS

FIG. 6 is a flow chart describing an exemplary dynamic compression adjustment process implemented by the network monitoring agent of FIG. 3; and FIG. 7 is a flow chart describing an exemplary dynamic compression adjustment process implemented by the dynamic compression device of FIG. 4.

DETAILED DESCRIPTION

Figure 2:
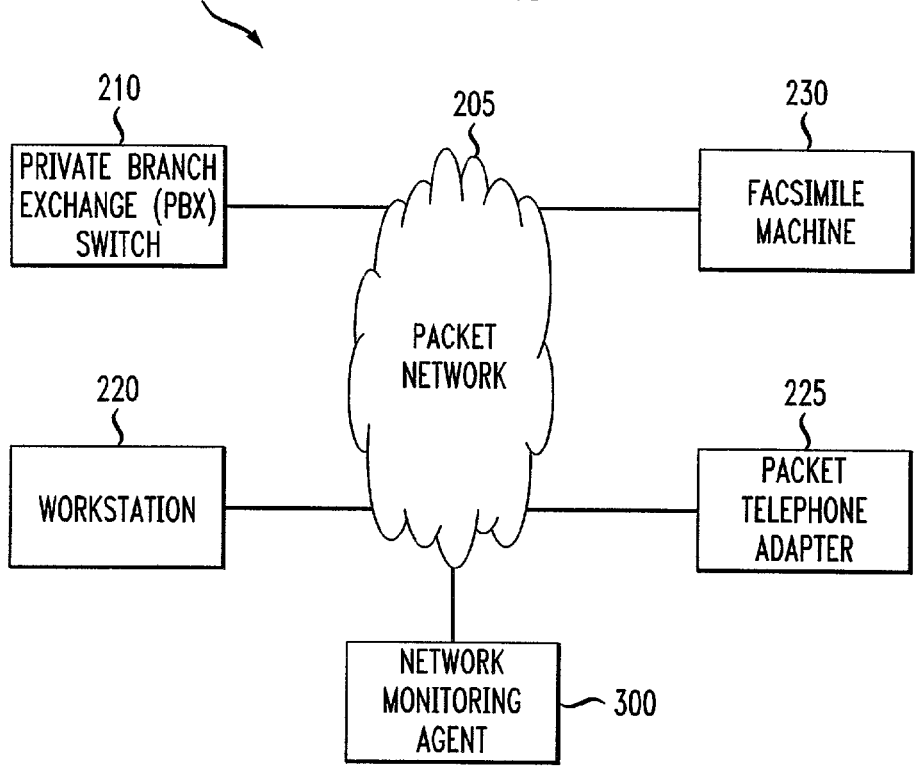
FIG. 2 illustrates a multimedia packet telephony system 200 in accordance with the present invention.

FIG. 2 illustrates a multimedia packet telephony system 200 in accordance with the present invention. The, present invention provides a network monitoring agent 300, discussed below in conjunction with FIG. 3, that monitors network conditions, such as traffic volume, and determines when to dynamically adjust the level of compression for one or more connections in order to maximize the total number of possible connections, while maintaining a desired level of quality.

According to one feature of the present invention, the network monitoring agent 300 selects a compression standard based on current network traffic volume. At times of lighter network traffic, a compression standard that provides a lower degree of compression and a higher quality level is selected. Likewise, as network traffic increases, a compression standard that provides a higher degree of compression, although at a lower quality level, is selected in order to maximize the network utilization. As network bandwidth utilization approaches the capacity of the network, there is a risk that packets may be dropped or delayed. Thus, if compression algorithms providing a higher degree of compression are utilized as network congestion increases, less bandwidth is utilized for the same number of connections.

In further variations of the present invention, the network monitoring agent 300 may dynamically adjust the compression scheme in response to other factors as well. In one variation, the network monitoring agent 300 may select a new codec in response to network error characteristics. For example, the network monitoring agent 300 may select a codec that is more tolerant of the type of network losses or errors that are currently occurring. For instance, some codecs might tolerate every n-th packet being dropped, while other codecs might tolerate burst errors better. In yet another variation, a new codec may be selected based on the time-of-day, such as switching to compressed codecs during busy hours. The network monitoring agent 300 may also adjust the compression scheme in response to network delays. For example, when network delay increases, the network monitoring agent 300 may select a new codec with a lower delay.

Figure 1:
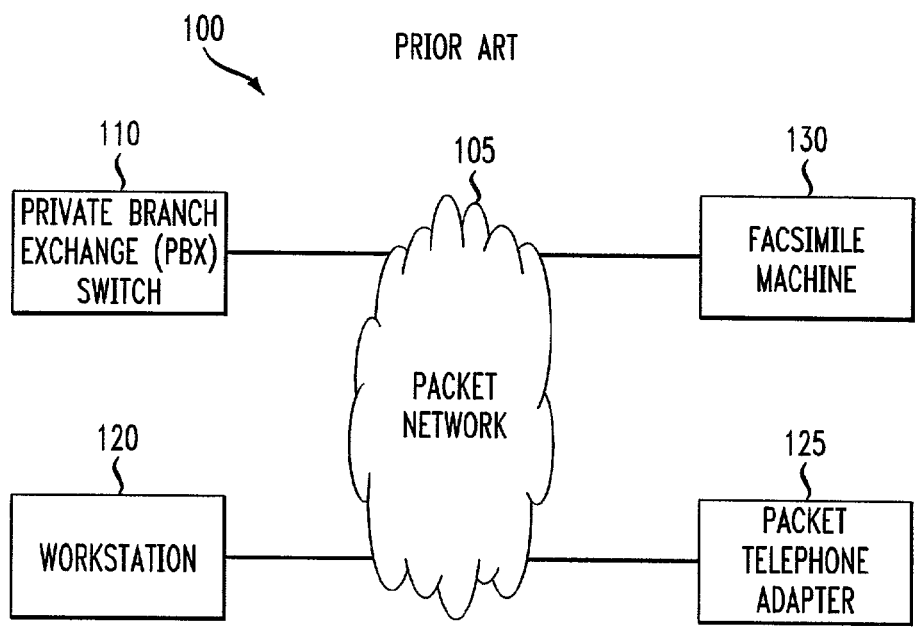
FIG. 1 illustrates a conventional multimedia packet telephony system.

As indicated above, FIG. 2 illustrates a multimedia packet telephony system 200, in accordance with the present invention. The packet telephony system 200 shown in FIG. 2 includes a packet network 205 that connects a number of devices, such as a private branch exchange (PBX) switch 210, workstation 220, packet telephone adapter 225 and a facsimile machine 230. The packet network 205 and connected devices, such as devices 210, 220, 225 and 230, may be embodied in the same manner as the conventional packet telephony system 100 shown and described above in conjunction with FIG. 1, as modified herein to incorporate the features and functions of the present invention.

Figure 3:
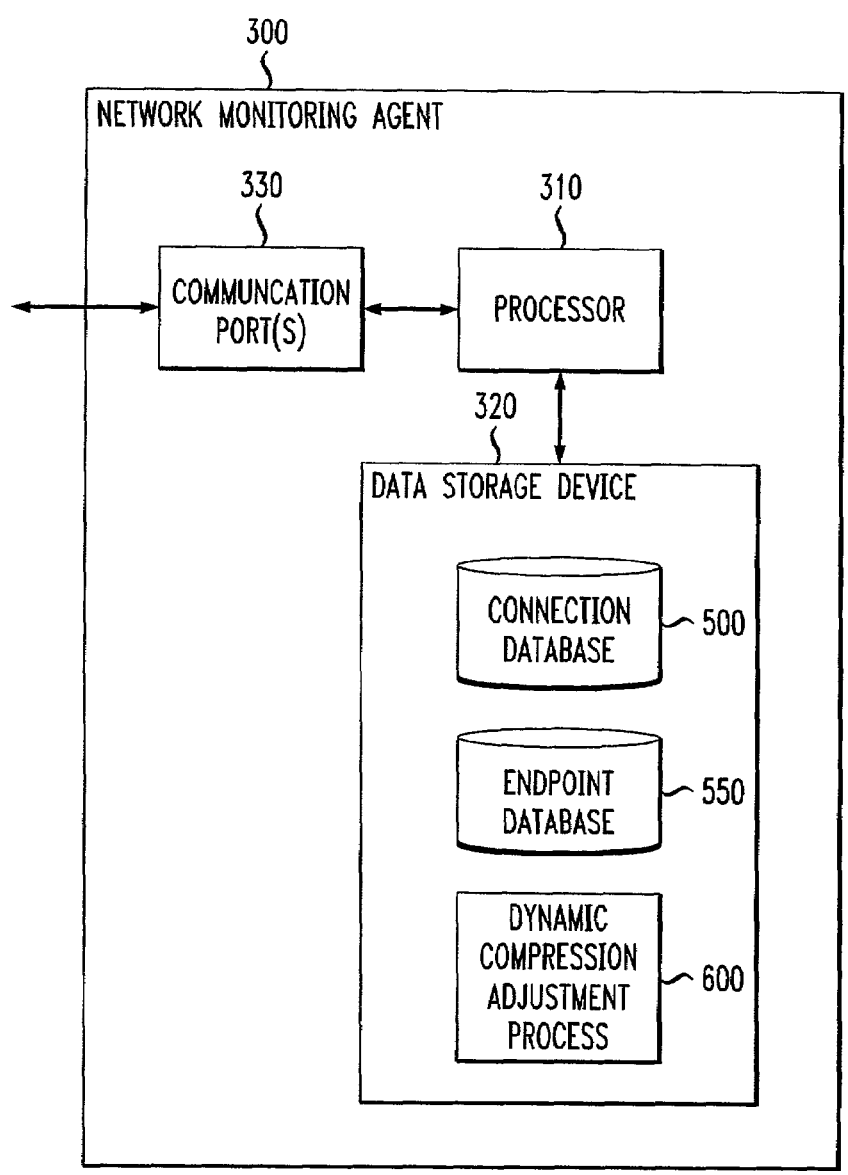
FIG. 3 is a block diagram illustrating the network monitoring agent of FIG. 2, in accordance with the present invention.

FIG. 3 is a block diagram showing the architecture of an illustrative network monitoring agent 300. The network monitoring agent 300 may be embodied, for example, as a workstation or server, as modified herein to execute the functions and operations of the present invention. The network monitoring agent 300 includes a processor 310 and related memory, such as a data storage device 320. The processor 310 may be embodied as a single processor, or a number of processors operating in parallel. The data storage device 320 and/or a read only memory (ROM) are operable to store one or more instructions, which the processor 310 is operable to retrieve, interpret and execute.

Figure 5:
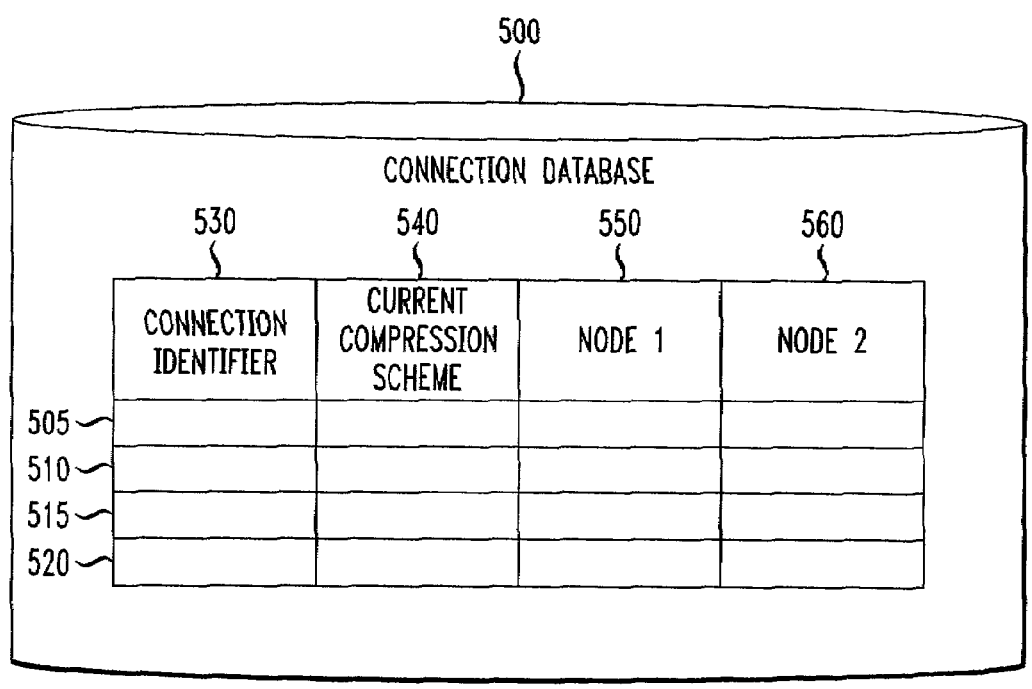
FIG. 5 illustrates a sample table from the connection database of FIG. 3.

As shown in FIG. 3, the data storage device 320 includes a connection database 500, shown in FIG. 5, that maintains information on each connection in the packet telephony environment 100. In addition, the data storage device 320 includes a dynamic compression adjustment process 600, shown in FIG. 6, that monitors network traffic and determines when to dynamically adjust the level of compression for one or more connections.

The communications port 330 connects the network monitoring agent 300 to the packet telephony environment 100, thereby linking the network monitoring agent 300 to each connected node or party.

The network monitoring agent 300 monitors network traffic and determines when to dynamically adjust the level of compression for one or more connections. If the compression algorithm is dynamically adjusted, the network monitoring agent 300 can send a message to one or more of the connected devices, such as devices 210, 220 and 225, which must respond by implementing the indicated codec. The device 210, 220 and 225 that receives the notification from the network monitoring agent 300 of a change in the compression algorithm is referred to as the initiator. As discussed below, the initiator preferably notifies the other party to the connection, referred to as the recipient, that all subsequent packets will be encoded with a new compression algorithm.

According to a further feature of the present invention, the network monitoring agent 300 informs one or both of the devices associated with each connection of changes in the compression scheme. In one implementation, the initiating device inserts a notification in a field of the packet header to inform the recipient device that subsequent packets will be encoded with a different specified algorithm, until further notice. Thereafter, the recipient device can load the appropriate codec to properly decode the received packets. In a further variation, the notification of a codec change (or the current codec) can be repeatedly included in the packet header at periodic intervals, or repeated a predetermined number of times in successive packets, to maximize the likelihood that the recipient device gets at least one notification. Thus, if a packet containing the notification is lost, the recipient device can still recover. It is noted that this form of in-band signaling in the packet header incurs no break in the media stream.

In addition, the recipient node can send acknowledgements to the initiating node in a packet header of a predetermined number of packets. Since packet telephony systems generally do not guarantee ordering of packets, any packet having a sequence number earlier than that carrying a change notification is ignored by the recipient device once the payload of a packet with a change notification has been processed into the data stream.

The initiator may optionally include in the same header that carries a change notification, a request to the receiving device to also use the switched codec in sending media back to the initiator. In this manner, both half-circuits will be compressed with the same compression algorithm. The receiver then replies by sending media in the switched codec in packets carrying both confirmation and codec change notification in their header extensions. Again, such information may be repeated in a predetermined number of consecutive packets.

The dynamic codec architecture of the present invention models all connections as two half-circuits: with one half-circuit from the caller-to-callee, and another half-circuit from the callee-to-caller. To make the dynamic codec scheme work reliably, the present invention allows both half circuits to use different codecs (with different compression and quality levels) and thus be configured asynchronously.

Figure 4:
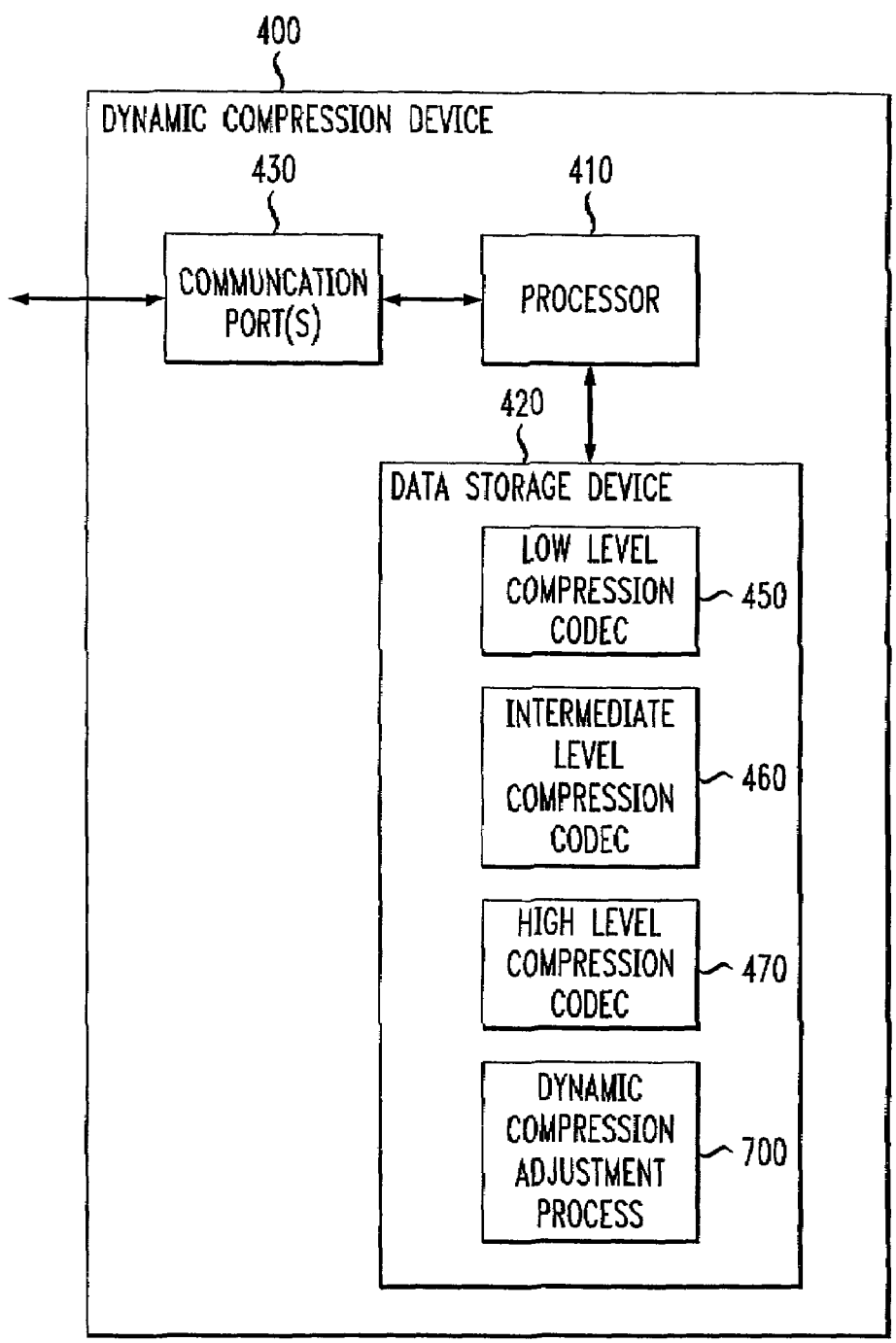
FIG. 4 is a block diagram illustrating a representative dynamic compression device in accordance with the present invention, such as telephone units connected to the private branch exchange (PBX) of FIG. 2.

A representative dynamic compression device 400 for dynamically adjusting the compression algorithm in accordance with the present invention is shown in FIG. 4. Generally, the dynamic compression device 400 includes a plurality of compression algorithms with a variable degree of compression. In the illustrative embodiment, the dynamic compression device 400 provides three separate compression algorithms, providing low, intermediate and high degrees of compression.

FIG. 4 is a block diagram showing the architecture of an illustrative dynamic compression device 400. As shown in FIG. 4, the dynamic compression device 400 includes a processor 410 and related memory, such as a data storage device 420. The processor 410 may be embodied as a single processor, or a number of processors operating in parallel. The data storage device 420 and/or a read only memory (ROM) are operable to store one or more instructions, which the processor 410 is operable to retrieve, interpret and execute.

As shown in FIG. 4, the data storage device 420 includes a low level compression codec 450, such as the G.722 standard, an intermediate level compression codec 460, such as the G.711 standard, and a high level compression codec 470, such as the G.729A standard. In addition, the data storage device 420 includes a dynamic compression adjustment process 700, discussed below in conjunction with FIG. 7. Generally, the dynamic compression adjustment process 700 receives notifications from the network monitoring agent 300 of a new compression scheme, and loads the appropriate codec 450, 460, 470.

In this manner, at times of lower network utilization, the network monitoring agent 300 can instruct the dynamic compression device 400 to utilize the low level compression codec 450 to provide the highest possible voice quality. As network utilization and traffic increases, the network monitoring agent 300 detects that network traffic has increased above a predefined, configurable threshold. Thereafter, the network monitoring agent 300 instructs the dynamic compression device 400 to utilize the intermediate or high level compression codec 460, 470, as appropriate for all new calls. The network monitoring agent 300 dynamically adjusts the compression of in-progress calls as well as new connection requests. The network monitoring agent 300 continues monitoring network traffic, and when network traffic again falls below a predefined, configurable threshold, the network monitoring agent 300 instructs all nodes to utilize higher quality codecs (with lower compression levels).

The communications port 430 connects the dynamic compression device 400 to the packet telephony environment 100, thereby linking the dynamic compression device 400 to each connected node or party.

FIG. 5 illustrates an exemplary connection database 500 that stores information on each connection in the packet telephony environment 100. The connection database 500 maintains a plurality of records, such as records 505–520, each associated with a different connection. For each connection identifier listed in field 530, the connection database 500 includes the current compression scheme associated with the connection in field 540, as well as identifiers for the nodes associated with the connection in fields 550, 560, respectively. In one embodiment, the connection database 500 indicates the various common compression schemes that are supported by both nodes in an extension field (not shown). In an alternate embodiment, the network monitoring agent 300 queries the nodes for their capabilities as part of the selection of a new compression scheme.

The network monitoring agent 300 has control over at least one (and sometimes more) endpoints in a call. When the network monitoring agent 300 initiates a codec change, the network monitoring agent 300 instructs the nodes under its control to start sending media with a different, specified codec. In one implementation, the network monitoring agent 300 does not instruct receiving endpoints (destination nodes)

which codec to switch to for processing incoming media data. It has been found that varying network delays causes problems with applying the appropriate codec to the corresponding packets. Rather, such synchronization is better achieved by in-band signaling, discussed above.

The network monitoring agent 300 needs to determine which is the common codec that both sending and receiving ends can use. If both end points are under control of the network monitoring agent 300 then the network monitoring agent 300 has the information as to which codecs are supported by each endpoint recorded in the endpoint database 500 (FIG. 5). Otherwise, the network monitoring agent 300 needs to cooperate with another foreign network monitoring agent network monitoring agent 300 or similar system to negotiate for a new codec.

If the network monitoring agent 300 does not control the far end device, and still wishes to cause the far end also to switch codec, the network monitoring agent 300 may nonetheless use in-band signaling to invite the far end device to change codecs.

Processes

As previously indicated, the network monitoring agent 300 implements a dynamic compression adjustment process 600, shown in FIG. 6, that monitors network conditions, determines when to dynamically adjust the level of compression for one or more connections and notifies the associated devices of changes to the compression scheme. In the illustrative embodiment, the monitored network condition is the volume of network traffic. The dynamic compression adjustment process 600 may be continuously or periodically executed to adjust the compression scheme.

As shown in FIG. 6, the network monitoring agent 300 performs a number of tests during steps 610, 630 and 660 to classify the network traffic volume and thereby select an appropriate compression scheme. In other words, in the illustrative implementation, the dynamic compression adjustment process 600 determines if current network traffic volume is relatively low, intermediate or high, respectively. For example, the dynamic compression adjustment process 600 may utilize an upper and lower bound for each test performed during steps 610, 630 and 660 to classify the network traffic.

If it is determined during step 610 that network traffic is "low," a compression standard that provides a low degree of compression and a corresponding higher quality level will be selected. Program control then proceeds to step 670 for selection of a compression scheme. If, however, it is determined during step 610 that network traffic is not "low," then program control proceeds to step 630.

If it is determined during step 630 that network traffic is "intermediate," an appropriate intermediate compression standard is likewise selected. Program control then proceeds to step 670. If, however, it is determined during step 630 that network traffic is not "intermediate," then program control proceeds to step 660.

If it is determined during step 660 that network traffic is "high," an appropriate compression standard is likewise selected, that provides a higher degree of compression, although at a lower quality level. Program control then proceeds to step 670. If, however, it is determined during step 660 that network traffic is not "high," then an error has occurred and error handling is implemented during step 665.

A test is performed during step 670 to determine whether a change in the current compression scheme has occurred. If it is determined during step 670 that a change in the current compression scheme has occurred, then the dynamic compression adjustment process 600 selects a compression scheme during step 680 (i) supported by both parties to each connection and (ii) suitable for the condition that caused the change in the current compression. Thereafter, the dynamic compression adjustment process 600 notifies one or both of the devices associated with each connection of the new compression scheme during step 690. Program control then returns to step 610 for continuous processing.

In further variations of the present invention, the dynamic compression adjustment process 600 dynamically adjusts the compression scheme in response to network error characteristics or time-of-day, as indicated above.

As previously indicated, each dynamic compression device 400 implements a dynamic compression adjustment process 700, shown in FIG. 7, to monitor packet headers for a notification from the network monitoring agent 300 of a new compression scheme, and to thereafter load the appropriate codec 450, 460, 470. As shown in FIG. 7, the dynamic compression adjustment process 700 monitors for a notification of a new compression scheme during step 710. It is noted that devices may be directly notified of a new compression scheme by the network monitoring agent 300 as well as receiving a notification of a new compression scheme in a packet header from another device.

A test is performed during step 720 to determine if the device has received a notification of a new compression scheme. If it is determined during step 720 that the device has received a notification of a new compression scheme, then the dynamic compression adjustment process 700 loads the appropriate codec 450, 460, 470 during step 730 for processing subsequent packets. If, however, it is determined during step 720 that the device has not received a notification of a new compression scheme, then program control returns to step 710 and continues in the manner described above. Program control terminates during step 740.

Application-Dependent Compression Scheme Selection

It is noted that different compression and coding schemes may be better suited for certain applications. While it is possible to decode information encoded with one encoder and reencode it with a different encoder (a process called "transcoding"), this is resource intensive, degrades voice quality, and adds latency into the connection. Given these drawbacks, transcoding is avoided whenever possible. For example, some voicemail applications store voice in a compressed format, such as the G.729A format. Thus, the network monitoring agent 300 preferably switches the caller's codec to send voice to the voice mail server already encoded with the appropriate codec for the caller to voice mail segment, rather than requiring transcoding to happen somewhere in the system 200. In addition, interactive voice response (IVR) units store voice prompts with a compressed codec and want to avoid transcoding on playback, as well. Alternatively, a speech recognition element (or teleconferencing bridge) may prefer voice to be provided in a very high quality linear codec, like 16-bit PCM.

For example, for an IVR application, assume the network monitoring agent 300 (or the application itself) sets the codec on the caller to an interactive voice response unit (IVR) segment to a G.711 encoding scheme. Initially, the advanced intelligent agent must play a pre-recorded greeting to the caller, which was encoded with a G.729A compression scheme. Thus, the intelligent agent forces the codec for the half-circuit segment from the IVR to the caller to use the G 729A codec to avoid having to transcode the prerecorded prompts. After the prompt has played, the intelligent agent forces the half-circuit segment from the caller to the IVR to use PCM 16 to improve performance of the speech recognition engine. If the caller asks to leave a message, then the intelligent agent can negotiate with the caller with an invitation for the caller-to-agent half circuit segment to use the codec that is native to voice mail, such as G.729A. After the message has been recorded, the agent can switch the caller-to-agent half circuit back to PCM 16 to support speech recognition again.

Thus, according to a further feature of the present invention, each application (or the network monitoring agent 300) dynamically selects a compression scheme for each (unidirectional) half-circuit based on the requirements of the application. In addition, the compression scheme selected for one or both half-circuits may be dynamically adjusted over time in response to the current needs of a given transaction being performed by the application. For example, for the IVR application discussed above, after the IVR plays a pre-recorded greeting to the caller using a first compression scheme for the IVR to caller half-circuit, a different compression scheme with improved quality is selected for the caller to IVR half-circuit when the IVR is performing speech recognition. Thereafter, if the caller elects to leave a message, a different compression scheme with higher compression (appropriate for voice mail) is then selected for the caller to IVR half-circuit.

In addition, a number of signal processing applications may implement variable encoding schemes based on conditions associated with the connection. For example, an application may select a new encoding scheme in response to a user-modification of the volume or speed settings associated with the connection.

It is to be understood that the embodiments and variations shown and described herein are merely illustrative of the principles of this invention and that various modifications may be implemented by those skilled in the art without departing from the scope and spirit of the invention.

For example, rather than changing the codec itself, the network monitoring agent 300 may adjust a particular parameter of a currently selected codec. It is noted that packetization is covered in the purview of dynamic codec negotiation, so the network monitoring agent 300 might change the packetization time or silence-suppression policy, as well. In addition, rather than notifying dynamic compression devices 400 of a particular compression scheme to utilize, the network monitoring agent 300 may merely notify the dynamic compression devices 400 of current network conditions, which are used by the dynamic compression devices 400 that are a party to a connection to select an appropriate common compression scheme.

We claim:

1. A method for dynamically adjusting the bandwidth utilized by a plurality of applications, each of said applications communicating with an endpoint over a connection in a network, said method comprising the steps of:
   selecting at least one encoding scheme for at least one of said connection during a call set-up phase based upon encoding requirement of said application associated with said at least one connection, each of said applications having a different encoding requirement;
   monitoring one or more conditions on said network during said at least one connection; and
   selecting a new encoding scheme for said at least one connection if one or more conditions have occurred.

2. The method of claim 1, wherein said one or more conditions include a predefined network traffic level.

3. The method of claim 2, wherein an encoding standard that provides a lower degree of compression is selected at times of lighter network traffic.

4. The method of claim 2, wherein an encoding standard that provides a higher degree of compression is selected as network traffic increases.

5. The method of claim 1, wherein said one or more conditions include a predefined network error characteristic and an encoding scheme is selected that performs well under the observed network error characteristic.

6. The method of claim 1, wherein said one or more conditions include a predefined time period.

7. The method of claim 1, wherein an encoding scheme is independently selected for each half-circuit associated with said at least one of connections.

8. The method of claim 1, further comprising the step of notifying at least one of the devices associated with a connection of said change in the encoding scheme.

9. The method of claim 8, further comprising the step of inserting a notification in a packet header indicating that subsequent packets will be encoded with a different specified encoding algorithm.

10. A system for dynamically adjusting the bandwidth utilized by a plurality of applications, each of said applications communicating with an endpoint over a connection in a network, said system comprising:
    a memory for storing computer-readable code; and
    a processor operatively coupled to said memory, said processor configured to;
    select at least one encoding scheme for at least one of said connections during a call set-up phase based upon an encoding requirement of said application associated with said at least one connection, each of said applications having a different encoding requirement;
    monitor one or more conditions on said network during said connection; and
    select a new encoding scheme for said connection if one or more conditions have occurred.

11. The system of claim 10, wherein said one or more conditions include a predefined network traffic level.

12. The system of claim 11, wherein an encoding standard that provides a lower degree of compression is selected at times of lighter network traffic.

13. The system of claim 11, wherein an encoding standard that provides a higher degree of compression is selected as network traffic increases.

14. The system of claim 10, wherein said one or more conditions include a predefined network error characteristic and an encoding scheme is selected that performs well under the observed network error characteristic.

15. The system of claim 10, wherein said one or more conditions include a predefined time period.

16. The system of claim 10, wherein an encoding scheme is independently selected for each half-circuit associated with said connection.

17. The system of claim 10, wherein said processor is further configured to notify at least one of the devices associated with a connection of said change in the encoding scheme.

18. The system of claim 17, wherein said processor is further configured to insert a notification in a packet header indicating that subsequent packets will be encoded with a different specified encoding algorithm.

19. A method for dynamically adjusting the bandwidth utilized by a plurality of applications each of said applications communicating with an endpoint over a connection in a network, said method comprising the steps of:
- receiving an encoding scheme indication for at least one of said connections during a call set-up phase based upon a encoding requirement of said application associated with said at least one connection, each of said applications having a different encoding requirement;
- monitoring for an indication of a new encoding scheme for said connection; and
- decoding subsequent data with said new encoding scheme if said monitoring step detects a change in said encoding scheme.

20. The method of claim 19, wherein said indication is received if a network traffic level exceeds a predefined threshold.

21. The method of claim 20, wherein an encoding standard that provides a lower degree of compression is selected at times of lighter network traffic.

22. The method of claim 20, wherein an encoding standard that provides a higher degree of compression is selected as network traffic increases.

23. The method of claim 19, wherein said indication is received if a predefined network error characteristic is detected and an encoding scheme is selected that performs well under the observed network error characteristic.

24. The method of claim 19, wherein said indication is received for a predefined time period.

25. The method of claim 19, wherein an encoding scheme is independently selected for each half-circuit associated with said connection.

26. The method of claim 25, wherein said monitoring step evaluates a packet header for a notification indicating that subsequent packets will be encoded with a different specified encoding algorithm.

27. A system for dynamically adjusting the bandwidth utilized by a plurality of applications, each of said applications communications with an endpoint over a connection in a network, said system comprising:
- a memory for storing computer-readable code; and
- a processor operatively coupled to said memory, said processor configured to;
- receive an encoding scheme indication for at least one of said connections during a call set-up phase based upon a encoding requirement of said application associated with said at least one connection, each of said application having a different encoding requirement;
- monitor for an indication of a new encoding scheme for said connection; and
- decode subsequent data with said new encoding scheme if said monitoring step detects a change in said encoding scheme.

28. The system of claim 27, wherein said indication is received if a network traffic level exceeds a predefined threshold.

29. The system of claim 28, wherein an encoding standard that provides a lower degree of compression is selected at times of lighter network traffic.

30. The system of claim 28, wherein an encoding standard that provides a higher degree of compression is selected as network traffic increases.

31. The system of claim 27, wherein said indication is received if a predefined network error characteristic is detected.

32. The system of claim 27, wherein said indication is received for a predefined time period.

33. The system of claim 27, wherein an encoding scheme is independently selected for each half-circuit associated with said connection.

34. The system of claim 27, wherein said monitoring step evaluates a packet header for a notification indicating that subsequent packets will be encoded with a different specified encoding algorithm.

35. A method for encoding a connection between a calling party and an application in a network, said system comprising the steps of:
- establishing said connection, wherein said connection has a plurality of call segments between said calling party and said application, each of said call segments having a different encoding requirement; and
- selecting an encoding scheme for each of said segments based on said corresponding encoding requirement.

36. The method of claim 35, further comprising the step of adjusting the encoding scheme selected for one or more of said call segments over time in response to the current needs of a given transaction being performed by said application.

37. The method of claim 35, wherein said application is a voice mail application and said selected encoding scheme is selected to record messages in a compressed format.

38. The method of claim 35, wherein said application is an interactive voice response (IVR) application and said selected encoding scheme provides improved quality for the calling party to IVR half-circuit when the IVR is performing speech recognition.

39. The method of claim 35, wherein said application is an interactive voice response (IVR) application and said selected encoding scheme provides higher compression for the calling party to IVR half-circuit when the IVR is recording a message.

40. The method of claim 35, wherein said application is a signal processing application and a new encoding scheme is selected for an adjustment to the volume of said connection.

41. The method of claim 35, wherein said application is a signal processing application and a new encoding scheme is selected for adjustment to the speed of said connection.

* * * * *

UNITED STATES PATENT AND TRADEMARK OFFICE
CERTIFICATE OF CORRECTION

PATENT NO.         : 7,020,263 B2
APPLICATION NO. : 09/783191
DATED                  : March 28, 2006
INVENTOR(S)        : Bauer et al.

It is certified that error appears in the above-identified patent and that said Letters Patent is hereby corrected as shown below:

In column 7, line 14, before "300 or similar" and after "agent" delete -- network monitoring agent --.

In column 9, line 60, before "during a call" and after "said" replace "connection" with -- connections --.

In column 10, line 38, before "; and" and after "said" replace "connection" with -- at least one connection --.

In column 10, line 39, before "if one" and after "said" replace "connection" with -- at least one connection --.

In column 11, line 9, before "; and" and after "said" replace "connection" with -- at least one connection --.

In column 11, line 44, before "encoding requirement" replace "a" with -- an --.

In column 11, lines 45-46, before "having a different" and after "each of said" replace "application" with -- applications --.

In column 11, line 48, before "; and" and after "said" replace "connection" with -- at least one connection --.

In column 12, line 20, before "compris-" and after "said" replace "system" with -- method --.

UNITED STATES PATENT AND TRADEMARK OFFICE
CERTIFICATE OF CORRECTION

PATENT NO.       : 7,020,263 B2
APPLICATION NO.  : 09/783191
DATED            : March 28, 2006
INVENTOR(S)      : Bauer et al.

It is certified that error appears in the above-identified patent and that said Letters Patent is hereby corrected as shown below:

In column 12, line 26, after "each of said" replace "segments" with -- call segments --.

Signed and Sealed this

Twenty-ninth Day of August, 2006

JON W. DUDAS
*Director of the United States Patent and Trademark Office*